D. J. THAYER.
CUSHION TIRE.
APPLICATION FILED SEPT. 1, 1910.
988,045.
Patented Mar. 28, 1911.
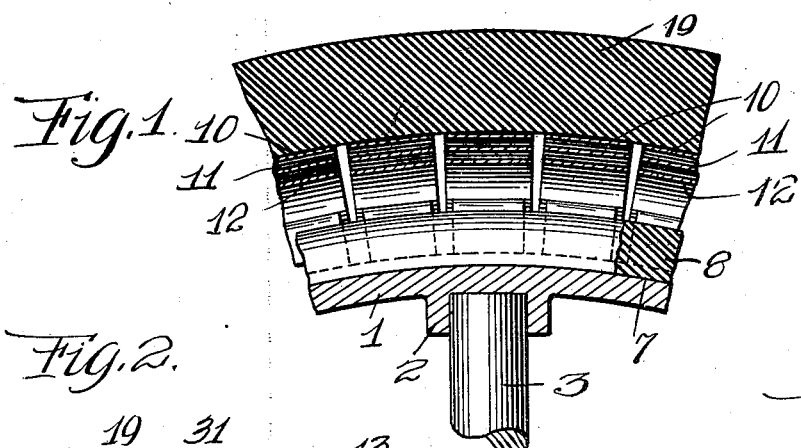
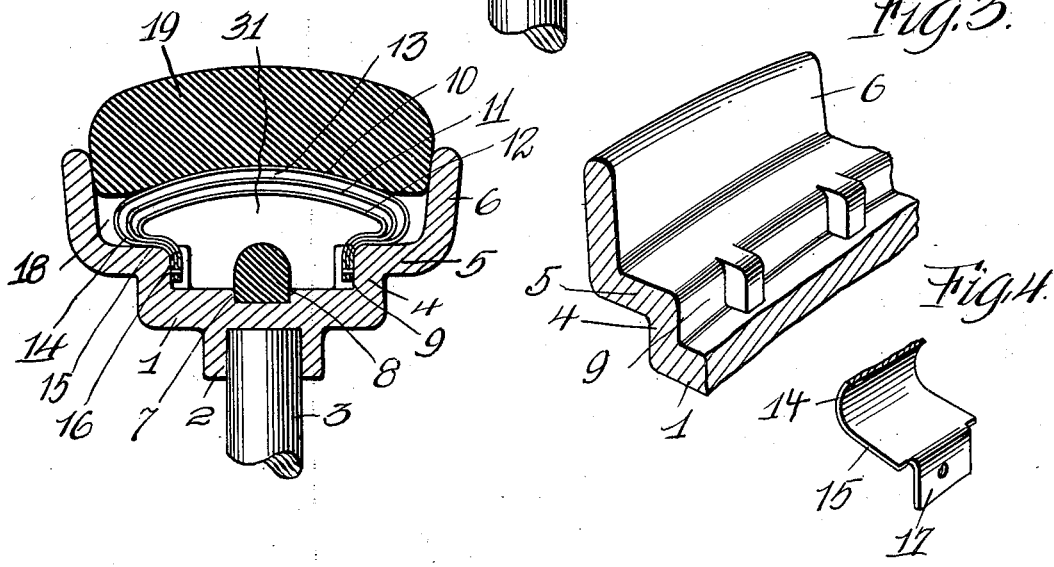
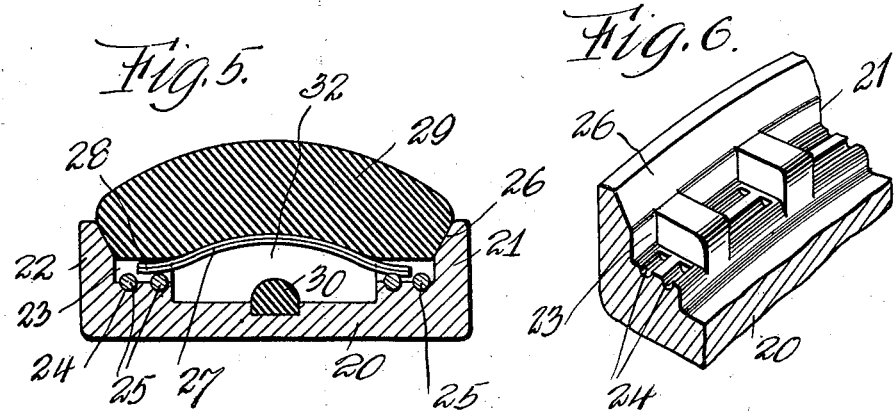
WITNESSES
INVENTOR
Dexter J. Thayer

UNITED STATES PATENT OFFICE.

DEXTER J. THAYER, OF PITTSBURG, PENNSYLVANIA.

CUSHION-TIRE.

988,045.  Specification of Letters Patent.  Patented Mar. 28, 1911.

Application filed September 1, 1910. Serial No. 579,974.

*To all whom it may concern:*

Be it known that I, DEXTER J. THAYER, a citizen of the United States of America, residing at Pittsburg, in the county of Allegheny and State of Pennsylvania, have invented certain new and useful Improvements in Cushion-Tires, of which the following is a specification, reference being had therein to the accompanying drawing.

This invention relates to cushion tires and has for its object to provide in a manner as hereinafter set forth a solid rubber tired wheel, more especially designed for automobiles, possessing the resilient qualities of pneumatic tires without being subject to injury by punctures.

Further objects of the invention are to provide a cushion tire which is comparatively simple in its construction and arrangement, strong, durable, possessing the necessary resiliency to absorb shock, efficient in its use, readily assembled and comparatively inexpensive to manufacture.

With the foregoing and other objects in view, the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In describing the invention in detail, reference is had to the accompanying drawing, wherein like reference characters designate corresponding parts throughout the several views, and in which:—

Figure 1 is a longitudinal sectional view broken away of a tire in accordance with this invention, Fig. 2 is a transverse section, Fig. 3 is a perspective view broken away of a portion of the rim, Fig. 4 is a detail illustrating one end of a cushioning spring, Fig. 5 is a cross sectional view of a modified form, and Fig. 6 is a perspective view of a portion of the rim used in connection with the form shown in Fig. 5.

Referring to Figs. 1 to 4 of the drawing, 1 denotes the body portion of a channel-shaped rim provided with a plurality of sockets, only one shown and which is indicated by the reference character 2, and which has secured therein the outer end of a spoke 3. The body portion of the rim at each side terminates in an outwardly extending flange 4 which merges in the horizontal portion 5 of an angle-shaped extension. The vertical portion of each of said extensions is indicated by the reference character 6 and is of a length greater than the horizontal portion. The body portion of the rim has its outer face provided with a circumferentially extending groove 7 in which is seated a resilient buffer 8 having its outer terminus in alinement with the horizontal portions 5 of the angle-shaped extensions. The inner face of each of the flanges 4 is provided with a series of pockets 9 for a purpose to be presently referred to. The pockets 9 are located along the inner face of each of the flanges 4.

Arranged within the rim is a circumferentially extending series of sets of cushioning elements, each set consisting of a plurality of springs extending transversely with respect to the rim. The springs of each set are indicated by the reference characters 10, 11 and 12. The spring 10 incloses the spring 11 and the spring 11 incloses the spring 12. Each of the springs of each set is substantially bow-shaped in contour and each is spaced from the other as indicated at 13. Each of the springs at each end is bent in a curvilinear manner, as at 14 and then laterally as at 15 and then inwardly as at 16. The laterally extending portions 15 of the springs at each end thereof abut and the inwardly extending portions of the springs also abut and project into the pocket 9 and are fixedly secured together by a pin 17. The laterally-extending portions 16 of the spring 10 are seated upon the free terminus of the flange 4 and also partly extend upon the horizontal portions 5 of the angle-shaped extensions. The spring 10 which is the longest spring is so disposed as to have a space 18 formed therebetween and the inner face of the vertical portions of the angle-shaped extensions.

Mounted in the rim and between the vertical portions of the angle-shaped extensions, as well as abutting against the inner face of said vertical portions and bearing against the spring 10 of each set is a solid resilient tread-piece 19. The spring 10 acts as a means to cushion the tread-piece 19, and when pressure is applied to the tread-piece and overcomes the tension of the spring 10, the latter is forced inwardly against the spring 11 which then assists the spring 10 in cushioning the tread, if pressure should overcome the springs 10 and 11, the spring 11 is forced against the spring 12 and the latter is then used in connection with the springs 10 and 11 for cushioning purposes. By providing the three springs in the manner as shown, the spring 11 is used to reinforce the spring 10 and the spring 12 used to reinforce the spring 11, when the spring 12 is used to reinforce the spring 11 then these two latter springs reinforce the spring 10. The sets of cushioning elements maintain the tread-piece 19 extended and are utilized not only to absorb shock when the wheel travels over uneven surfaces or meets with an obstruction, but also constitute means for cushioning the tread and perform the function of a pneumatic tube. The buffer 8 is utilized as a resilient cushion or abutment for the sets of springs when excessive pressure is applied to the tread so as to force the sets of springs inwardly between the flanges 4.

Referring to Figs. 5 and 6 of the drawing, the rim is indicated by the reference character 20 and is substantially channel-shaped in contour and has the side walls 21, 22 cut away to provide a circumferentially extending series of pockets 23 provided with recesses 24 in the bottoms thereof in which are mounted bearing rollers 25. The pockets are of less depth than the depth of each of the walls of the rim and that portion of the inner face of each of the walls which projects outwardly of the pockets 23 is beveled, as at 26. Arranged within the rim 20 is a series of sets of cushioning members, each set consisting of a pair of bow-shaped springs 27 arranged in close contact with each other and having the ends 28 thereof extending in the pockets 23. Mounted against the outer spring of each set and bearing against the beveled portions 26 of the walls of the rim is a resilient solid tread member 29 cushioned through the medium of the springs 27. When pressure is applied to the tread 29, the springs 27 are compressed whereby the ends of the springs will ride upon the bearing rollers 25. A resilient buffer 30 is secured in the rim for the springs 27.

By setting up the tread as shown in Fig. 1 and also in the manner as shown in Fig. 5, an air chamber is provided, the chamber in the form shown in Fig. 1 being designated by the reference character 31 and the chamber in the form shown in Fig. 5 by the reference character 32. As the tread members 19 snugly engage the angle-shaped extensions and the tread member 29 snugly engages the beveled portions 26 of the walls of the rim a substantially air-tight chamber is provided as is obvious.

What I claim is:—

1. A tire comprising a channel-shaped rim having the inner face of each of its side walls provided with a set of circumferentially-extending pockets, each of the pockets of less height than the height of its respective wall and arranged inwardly of the outer terminus of the wall, a circumferentially extending series of cushioning elements mounted in the rim, said elements extending transversely with respect to the rim and having the ends thereof projecting in said pockets, and a resilient solid tread member mounted in the rim and engaging the cushioning elements.

2. A tire comprising a channel-shaped rim having the inner face of each of its side walls provided with a set of circumferentially-extending pockets, each of the pockets of less height than the height of its respective wall and arranged inwardly of the outer terminus of the wall, a circumferentially-extending series of cushioning elements, each of said elements consisting of a plurality of superposed resilient members extending transversely with respect to the rim and having the ends thereof projecting in said pockets, a resilient solid tread member mounted in and snugly engaging the inner face of the walls of the channel and abutting against said cushioning elements, and a resilient buffer seated in the rim for said cushioning elements.

In testimony whereof I affix my signature in the presence of two witnesses.

DEXTER J. THAYER.

Witnesses:
N. LEWIS BOGAN,
EVA A. MILNE.